(12) United States Patent
Sperry et al.

(10) Patent No.: US 11,206,774 B2
(45) Date of Patent: Dec. 28, 2021

(54) VERTICAL HYDROPONIC GROWING SYSTEM AND METHOD

(71) Applicant: Pod Farms, LLC, Blacksburg, VA (US)

(72) Inventors: Toni Sperry, Blacksburg, VA (US); John Puleo, Blacksburg, VA (US); Seth Sperry, Blacksburg, VA (US); Darian Michels, Asheville, NC (US)

(73) Assignee: Pod Farms, LLC, Greenville, SC (US)

( * ) Notice: Subject to any disclaimer, the term of this patent is extended or adjusted under 35 U.S.C. 154(b) by 100 days.

(21) Appl. No.: 16/530,258

(22) Filed: Aug. 2, 2019

(65) Prior Publication Data

US 2020/0037526 A1 Feb. 6, 2020

Related U.S. Application Data

(60) Provisional application No. 62/713,781, filed on Aug. 2, 2018.

(51) Int. Cl.
*A01G 31/06* (2006.01)
*A01G 7/04* (2006.01)
*A01G 31/00* (2018.01)

(52) U.S. Cl.
CPC ............ *A01G 31/06* (2013.01); *A01G 7/045* (2013.01); *A01G 2031/006* (2013.01)

(58) Field of Classification Search
CPC .. A01G 31/06; A01G 2031/006; A01G 31/02; A01G 31/047; A01G 7/045; A01G 9/022; A01G 9/023; A01G 9/14; A01G 9/16; A01G 9/24; A01G 9/241; A01G 9/246; A01G 9/247; A01G 9/26; A01G 9/249; A01G 9/20; A01G 27/001; A01G 27/003; A01G 27/005; A01G 27/006; A01G 27/02; A01G 27/06

See application file for complete search history.

(56) References Cited

U.S. PATENT DOCUMENTS

| | | | |
|---|---|---|---|
| 3,053,011 A | 9/1962 | Silverman | |
| 7,055,282 B2 | 6/2006 | Bryan, III | |
| 9,591,814 B2 | 3/2017 | Collins et al. | |
| 2014/0000162 A1* | 1/2014 | Blank | A01G 31/06 47/62 A |
| 2014/0090295 A1* | 4/2014 | Fambro | A01G 9/1423 47/62 N |
| 2014/0318012 A1* | 10/2014 | Fujiyama | A01G 9/249 47/62 R |
| 2015/0305261 A1 | 10/2015 | Wilson et al. | |
| 2016/0050863 A1 | 2/2016 | Graber | |
| 2017/0094920 A1* | 4/2017 | Ellins | A01G 31/02 |
| 2017/0105372 A1* | 4/2017 | Bryan, III | A01G 31/02 |

(Continued)

OTHER PUBLICATIONS

ISA/US; International Search Report and Written Opinion; prepared for PCT/US2020/044531; dated Oct. 22, 2020.

*Primary Examiner* — Trinh T Nguyen
(74) *Attorney, Agent, or Firm* — Kirk A. Wilson; Joseph T. Guy; Patent Filing Specialist Inc.

(57) ABSTRACT

Systems and methods for vertical hydroponic growing of plants within an optional enclosure, in particular utilizing liquid nutrigation and/or solid nutrient medium/supplements in combination with vertically configured arrays of interchangeable grow cups to produce near year-round ideal plant growing conditions.

10 Claims, 7 Drawing Sheets

(56) References Cited

U.S. PATENT DOCUMENTS

| | | |
|---|---|---|
| 2017/0265408 A1 | 9/2017 | McGowan et al. |
| 2018/0007845 A1* | 1/2018 | Martin .................. A01G 7/045 |
| 2018/0014485 A1 | 1/2018 | Whitcher et al. |
| 2018/0263201 A1* | 9/2018 | Linneberg .............. A01G 31/02 |

* cited by examiner

VERTICAL HYDROPONIC GROWING SYSTEM AND METHOD

CROSS-REFERENCE TO RELATED APPLICATIONS

The present invention claims priority to U.S. Provisional Patent Application No. 62/713,781, filed Aug. 2, 2018, which is incorporated herein by reference in its entirety.

FIELD OF THE DISCLOSURE

The disclosure relates generally to systems and methods for vertical hydroponic growing of plants within an optional enclosure, in particular utilizing liquid nutrigation and/or solid nutrient medium/supplements in combination with vertically configured arrays of interchangeable grow cups to produce near year-round ideal plant growing conditions.

BACKGROUND OF THE DISCLOSURE

Hydroponics is the act of growing plants using nutrient-rich water. Plant roots in hydroponics are either continuously or periodically supplied nutrient-rich water with macro and micro plant nutrients in aqueous solution. Aquaponics is a form of hydroponics in that plants rely on nutrient-rich water instead of soil. Both hydroponics and aquaponics allow for plant growth in areas and/or ways not previously possible.

Vertical farming is the act of utilizing multiple levels in a vertical space to grow more plants per square foot and/or grow plants on vertical surfaces that otherwise could not support plants. When either hydroponics or aquaponics are combined with vertical farming, it creates a powerfully space saving and productive system.

Interest in vertical hydroponic growing systems has dramatically increased over the last few decades and there exists many known variations, including devices for commercial and home applications. Hydroponic systems are often referred to by the plant root mass nutrigation method used: 1) Mediaponic growing systems, utilizing artificial soil, also known as substrate or grow media, in which plants are rooted, usually utilize a mixture of organic (primary component) and inorganic materials (secondary component) substituting for natural traditional soil mixtures; 2) Aquaponic growing systems generally have plants rooted in liquid nutrient directly, with or without aquatic life such as fish, without use of substrate and relying upon direct application of liquid nutrient to plant roots by continuous emersion or by continuous contact with a film-flow or by alternatively flooding and draining, and 3) Aeroponic growing systems, with plants rooted in air, without use of grow media and involving spraying of plant roots with a liquid nutrient aerosol within a spray chamber or drip irrigation. Aeroponics requires no substrate and entails growing plants with their roots suspended in a chamber (the root chamber), with the roots periodically atomized with a fine mist or fog of nutrients, a process which uses significantly less water than alternative growing techniques. The three variations are all known to make use of root system containment apparatus generally known as grow tubes or grow cups, which are hollow, elongated generally cylindrical bodies often constructed of thermoplastic material such as PVC, and configured to hold multiple plants.

The present invention primarily represents advancement in the aeroponic variation of vertical hydroponic agriculture growing systems including improvements in grow tube and grow cup apparatus structure, nutrigation systems and related modular greenhouse enclosures. The invention overcomes a number of the known operational disadvantages of aeroponic growing and nutrigation systems and improves their efficiency, productivity, capacity for pathogen suppression, modularity and ability to be economically produced.

Many of the existing grow tubes and grow cups used in prior systems are constructed from materials that are not certified as suitable for use in potable water systems and may leach chemicals into the nutrient stream at concentrations considered to be above safe limits. Additionally, many existing closed-loop nutrigation and recycling system can facilitate spread of plant diseases when excessive quantities are circulated, or when the distribution system has an excessive number of open points, or when the nutrigation temperature is allowed to increase above a maximum limit, or when the recycling system does not include sufficient filtering, monitoring, analysis and adjustment to foster an optimal growth ecology and to counter pathogen growth and debilitating nutrient imbalances.

Currently, dry materials used in hydroponics use a strong concentration of supplements designed to be diluted in large amounts of water or, are to be used in large scale farming. This makes dry materials difficult to be handled by the untrained user, and even more difficult to use in small scale hydroponic farming. Currently, small scale hydroponic gardening relies on liquid nutrient resources. Liquid nutrients need particular measurements and prep work in order to supply nutrients to the plants correctly.

A relatively high level of grower skill, technology and operational knowledge has been required for proper aeroponic systems operation of current systems. Operating the nutrigation system, mounting and demounting of individual grow cups and other component parts has been difficult, and high operational water quantities have been required. Use of a common liquid nutrient and constant recycling, combined with the large volumes of liquid nutrient, can facilitate spread of plant diseases and algae growth. Relatively large quantities of spent nutrient are also created that must be recycled, monitored, adjusted for reuse and ultimately disposed of as waste product. Clogging of nutrigation components can reduce overall efficiency and increase maintenance costs. Consequently, there is a need for a vertical aeroponic growing system that overcomes the deficiencies described above.

SUMMARY OF THE INVENTION

A hydroponic plant cultivating apparatus comprising a rotatable planting column having a hollow interior for receiving a nutrigation manifold; at least one connect port disposed on the planting column for receiving at least one removable grow cup; a central pipe formed within and carried by the planting column extending axially through the hollow interior for supplying nutrigation fluid from a reservoir to the nutrigation manifold; a platform carried by the reservoir and engaging with a bottom portion of the planting column and configured to mount the planting column in a generally vertical orientation; and a growth control system comprising an automated lighting system and configured to monitor and control plant growth.

A method for growing hydroponic plants comprising the steps of installing at least one removable grow cup to a connect port on at least one module of a rotatable planting column having a hollow interior for receiving a nutrigation manifold; connecting a central pipe formed within and carried by the planting column, said central pipe extending axially through the hollow interior for supplying nutrigation fluid from a reservoir to the nutrigation manifold; mounting a platform that is carried by the reservoir and engaging with a bottom portion of the planting column configured in a generally vertical orientation; planting a plant species in the at least one removable grow cup; activating a growth control system configured to monitor and control plant growth; and harvesting the plant species.

BRIEF DESCRIPTION OF THE INVENTION

A hydroponic plant cultivating apparatus comprising a rotatable planting column having a hollow interior for receiving a nutrigation manifold; at least one connect port disposed on the planting column for receiving removable grow cups; a central pipe formed within and carried by the planting column extending axially through the hollow interior for supplying nutrigation fluid from a reservoir to the nutrigation manifold; a platform carried by the reservoir and engaging said bottom portion of the planting column to mount the planting column in a generally vertical orientation atop said reservoir in fluid communication; and a growth control system comprising an automated lighting system to monitor and control plant growth.

DETAILED DESCRIPTION OF THE INVENTION

Figure 1:
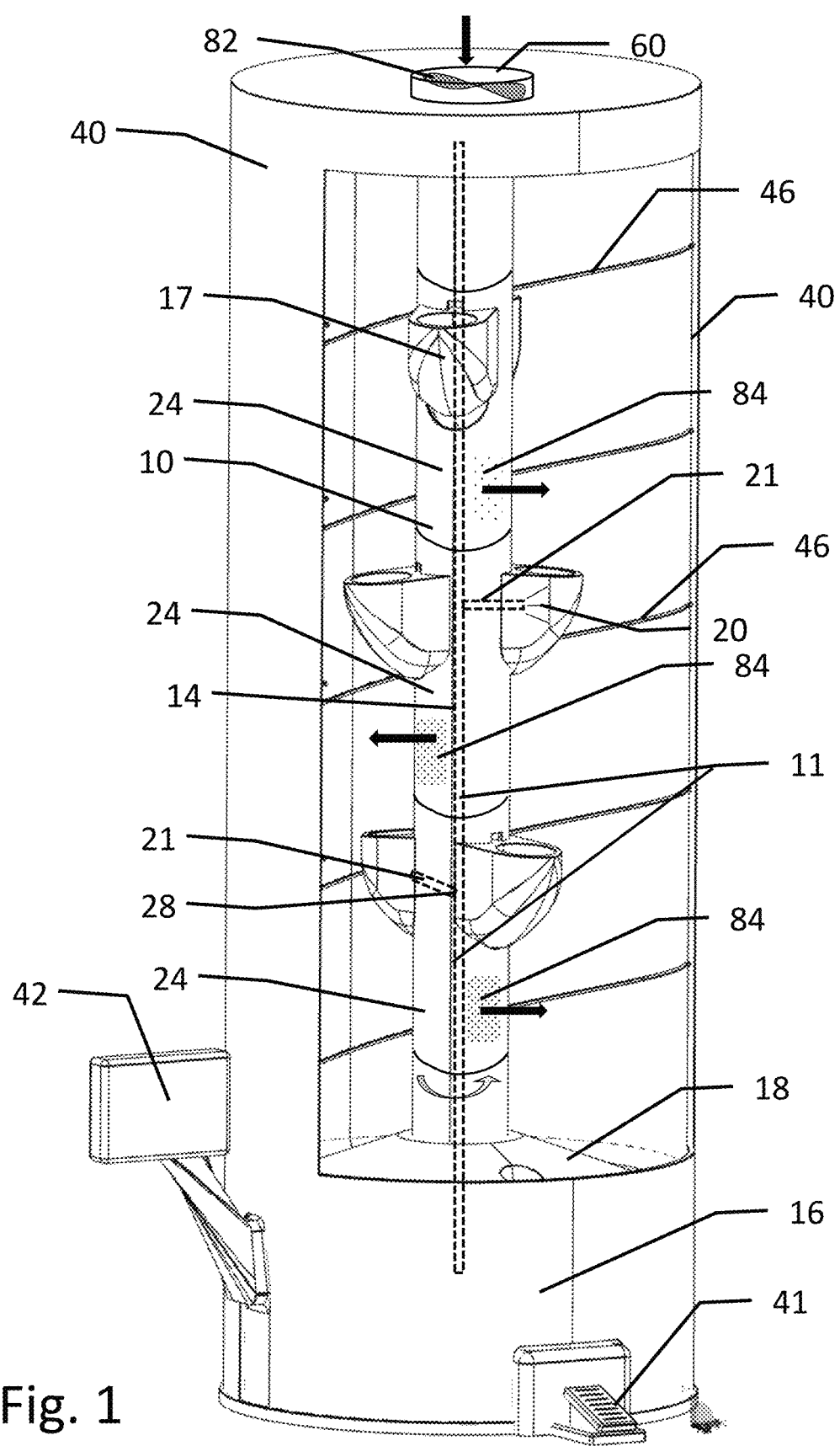
FIG. 1 illustrates a side perspective of one embodiment of the growing system.

Aeroponic systems described herein can provide more rapid plant maturity, more efficient nutrient absorption and pathogen suppression and therefore can increase crop yields, lower water consumption and a provide higher degree of grower control over the multitude of variables affecting production. These aeroponic systems are suitable for installation indoors and in shaded structures with or without use of climate-moderating greenhouse enclosures, and are capable of supporting cultivation of a near infinite variety of food, fiber, floriculture, medicinal and scientific crops. When installed in a climate-moderating greenhouse enclosure, or a modular transportable greenhouse enclosure, the hydroponic growing system and method offers the grower light-weight, durable, low maintenance, productive and highly resource efficient grow cups capable of adjustment to suit grower needs.

The nutrient levels, pH of nutrigation fluid, etc. may be monitored continually and/or intermittently, and may be adjustable throughout the crop cycle, with the option to provide each grow cup with different nutrigation solution depending on crop type and stage of growth. The nutrigation fluid and nutrient management may be fully automated and monitored to feedback to the database. Nutrigation may be adjusted by an operator as required; in particular, the operator may add supplements to improve plant health, crop quality and/or nutritional value of the crop.

Nutrigation flowrates may be pre-selected via the growth control system 50 and database which may record the location and contents of each grow cup, including for instance varietal information, sowing date, harvest date and any other information that may be desired, including information related to nutrient delivery, temperature, humidity and lighting throughout the growing cycle. The controller/control system and database enables complete traceability from sowing to harvest for each crop product.

Referring to FIGS. 1 thru 5, the outlet port(s) 32 may comprise nutrigation nozzles 21 (see FIG. 1) which deliver nutrigation fluid 20 and nutrients to each grow cup 17, flooding the plant roots before draining away. The outlet ports 32 may have a separate line supplying nutrigation fluid to a flushing port 31 for flushing the grow cup 17 with disinfectant and draining of such, to prevent buildup of biofilms. Each grow cup 17 may be supplied with a specified (dynamically controllable) volume of fluid/nutrient. Nutrigation frequency and volume is specific to the stage of growth or individual plant requirement for each grow cup.

Figure 2:
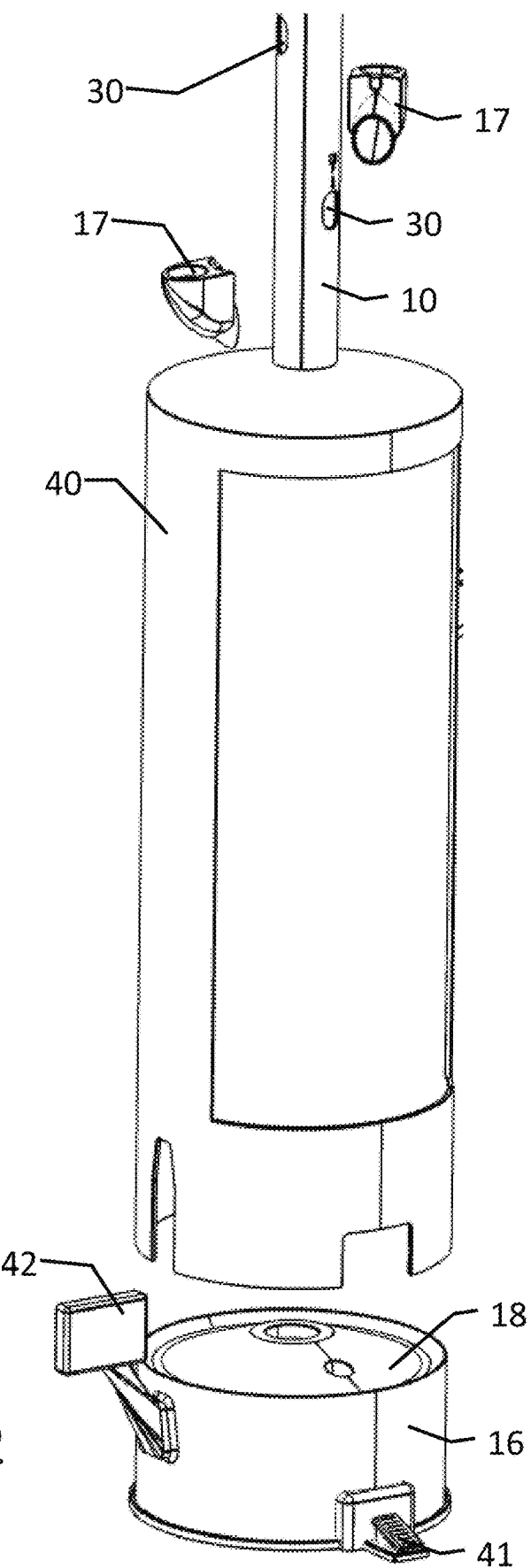
FIG. 2 illustrates an exploded view of a typical growing system.
Figure 3:
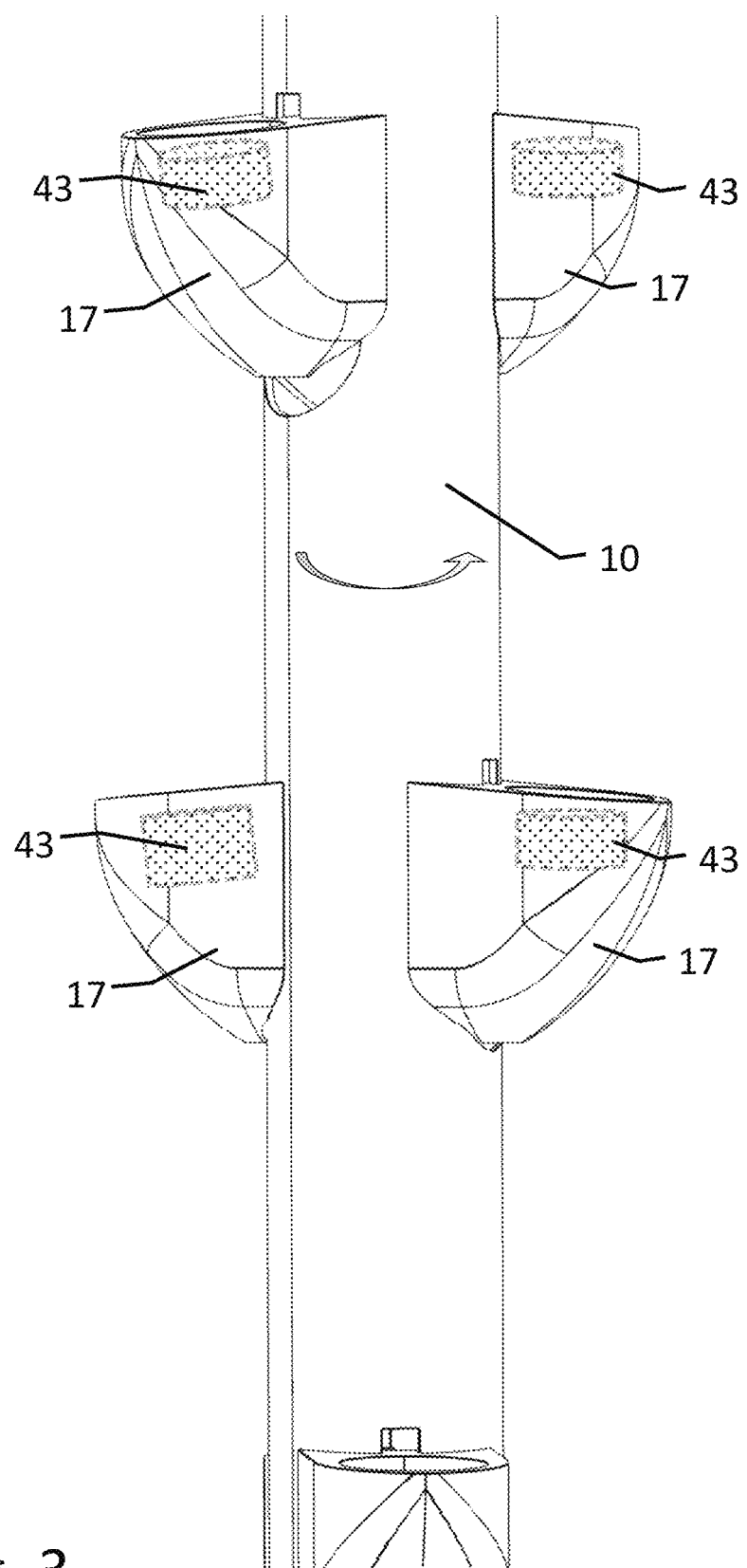
FIG. 3 illustrates a typical planting column with grow cups attached.

With reference to the drawings, the invention will now be described in more detail. Referring to FIGS. 1 and 2, an aeroponic plant cultivating apparatus is shown.

The apparatus includes a rotating planting column 10 constructed and arranged with a hollow interior for receiving a nutrigation manifold 11. The manifold 11 comprises all of the nutrigation supply piping above the swivel coupling 38. Connect ports, designated generally as 12, are located around planting column 10 for allowing nutrigation fluid supply and return to be routed to removable grow cups 17. A central pipe 14 and multiple branches 13 of the nutrigation manifold 11 are disposed within and carried by planting column 10, which extends axially through the hollow interior of the planting column 10 for supplying nutrigation fluid from a bottom reservoir 16 to each of the branches 13. The central pipe 14 need not be centrally positioned within planting column 10. A reservoir 16 is provided for holding nutrigation fluid that feeds the plants in each removable grow cup 17. A platform 18 is carried by reservoir 16 that engages the bottom portion of planting column 10 to mount the planting column 10 in a generally vertical orientation atop reservoir 16. As explained further below, planting column 10 is in fluid communication with reservoir 16 for circulating nutrigation fluid. The central pipe 14 extends into the reservoir 16 for fluid communication to branches 13 for directing nutrigation fluid from reservoir 16 upward. Accordingly, fluid may be circulated through the planting column to provide nutrients to the removable grow cups 17 for growing plants inserted into the grow cups 17.

The planting column 10 can be formed from a plurality of modules 24. Each of modules 24 having interior walls 26 forming a hollow module interior. Each module also includes an open top end and open bottom end. The fit between modules 24 should be a tight friction fit arrangement. In one embodiment, in order to separate modules 24, a notch is adapted to receive the end of a screwdriver or other such tool that can be used to pry the modules apart. An adjacent lower module 24 in planting column 10 can be stacked end-to-end to form continuous central pipe 14 which provides a continuous fluid passageway through the entire planting column, regardless of the number of modules stacked together. By making planting column 10 modular with central pipe 14, modules 24 can be exchanged at any time without having to worry about reinstalling a single elongated piece of conduit through all the planting column 10. Accordingly, this allows for crop staging and adding or removing modules as necessary without having to rebuild the entire planting column 10.

The planting column 10 can be constructed of most any thermoplastic, such as PVC or high impact polystyrene, to provide insulated walls for promoting a consistent temperature within the column. Polystyrene is a particularly effective insulator due to air gaps created in the material that act as a buffer. Additionally, these air gaps make polystyrene very light, regardless of whether it is a hardened or softer version of polystyrene.

Rotation of the planting column 10 can be initiated and controlled by a foot pedal 41 or other rotation means being operably connected to the rotatable planting column 10. The nutrigation manifold 11 also rotates with the planting column 10 at the swivel coupling 38 (see FIG. 6). Additionally, at least one user interface device 42, such as a touch screen, can electronically communicate with the growth control system 50 (see FIG. 6) to monitor and control parameters in the control circuit 58. The control circuit 58 can also wirelessly communicate with a remote user interface device, such as a smart phone or tablet, to access control parameters and monitor plant growth.

An optional modular greenhouse enclosure 40 can be used for plant protection and climate control. The position and orientation of the enclosure 40 can be adjusted for proper function and access. An access door can be provided in the enclosure 40 to provide easy access to the crops and planting column components. The enclosure can optionally include transparent or translucent greenhouse glazing, ventilation means, lighting and other elements of a contemporary greenhouse system can be included. The lighting system 46 can be disposed inside the enclosure 40 or can be attached to the outside of the enclosure 40. Additionally, the lighting system 46 can be used without the enclosure 40 using a separate support structure. The lighting system 46 can use dimmable lighting elements such as full-spectrum light emitting diodes (LED), switchable, selectable or tunable frequency (color temperature) LED's frequency, or other lighting elements as determined and controlled by the growth control system 50. The climate-moderating modular greenhouse enclosure 40 structure can have transparent, translucent, clear or darkened greenhouse side panels and roof panels as well as interior climate-moderating and air circulation systems 60. The roof panel can provide top structural support and/or hanging structural support for the entire planting column 10, with roof panel connection allowance for rotation of the planting column 10. The air circulation system 60 can use a fan 82 mounted in a roof panel to supply ambient air to the hollow interior of the planting column 10 and slightly pressurize the planting column 10 and the reservoir 16 with ambient air to support plant growth and prevent unwanted microbial growth in both the planting column 10 and reservoir 16. The planting column 10 can use perforated diffusers 84 to evenly distribute the ventilation air throughout the enclosure 40. The column 10 perforation sizes can be graduated along the length of the column such that each modular section diffuses a balanced ventilation rate throughout the column 10. The operating variables of the greenhouse enclosure, such as ventilation rate, lighting levels, and humidity levels, can be monitored and controlled by the plant growth control system 50 to maintain optimal environmental conditions for plant growth.

Figure 4:
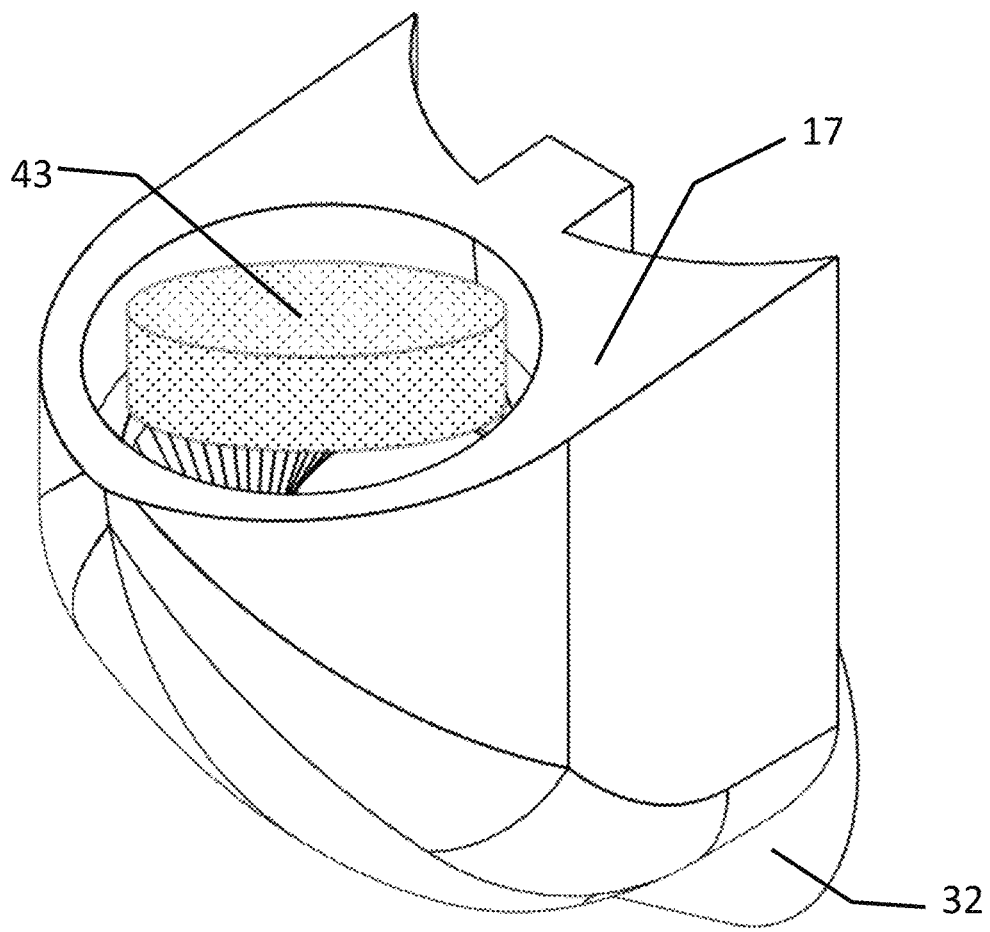
FIG. 4 illustrates a perspective or a typical grow cup.
Figure 5:
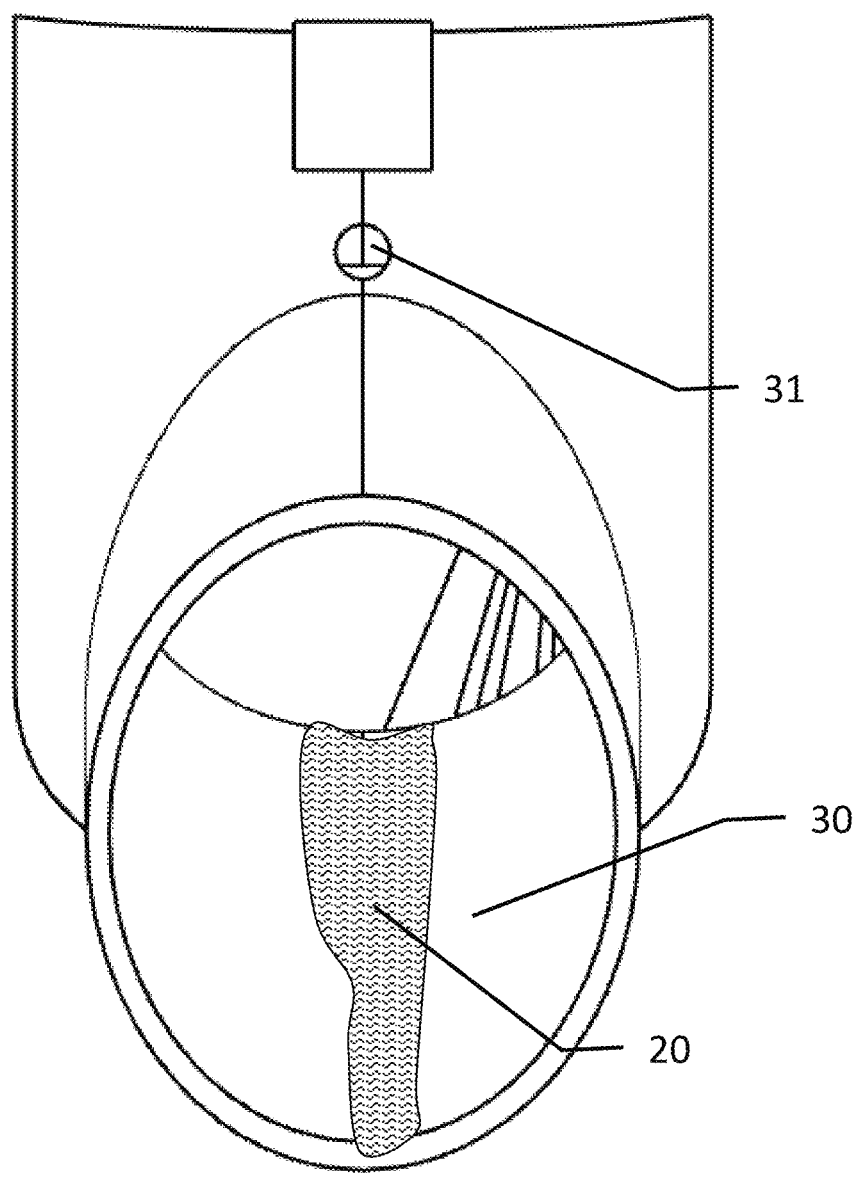
FIG. 5 illustrates a back view of a typical grow cup.
Figure 7:
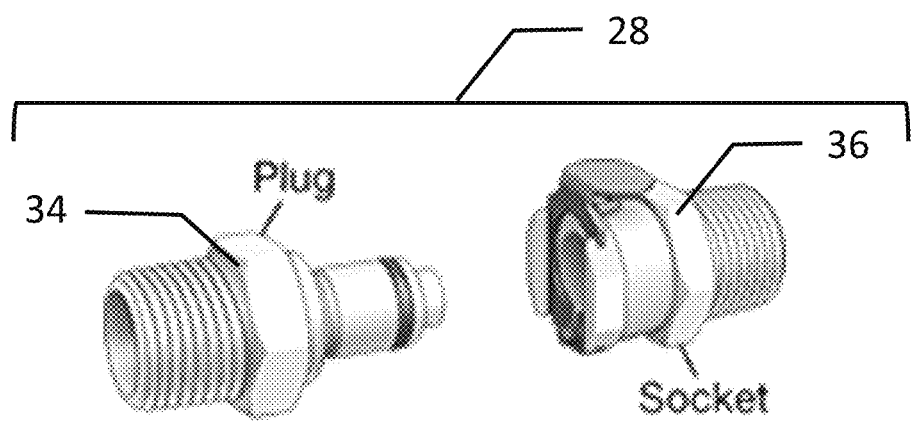
FIG. 7 illustrates a typical coupler for the nutrigation manifold.

Referring to FIGS. 4 and 5, the removable grow cups 17 can be interchanged at any location on the planting column 10. Sizes of the removable grow cups 17 can vary to accommodate various plants but the connection configuration to the planting column 10 is common. The coupler 28 (see FIG. 7) can be similar to a 'quick connect' fitting having a socket 36 configured on the planting column 10 configured as a self-sealing valve and a plug 34 configured on the removable grow cup 17 such that when the grow cup 17 is removed, the supply of nutrigation fluid 20 is blocked. Nutrigation fluid return openings 30 can be provided in planting column 10 to mate with the outlet ports 32 of the grow cups 17. Fluid return opening 30 allows the nutrigation fluid in the grow cup 17 to gravity drain down the interior walls 26 of the planting column 10, or other return tubing, and into reservoir 16, where the nutrigation fluid 20 can be replenished and recirculated. Nutrigation fluid 20 can be distributed for direct contact with the plantings through any suitable means such as spray nozzles, drip irrigation and the like. Sprout media 43, such as rock wool or hemp, can be inserted in the removable grow cups 17 to retain the position of early stage seedlings and other small plantings. The sprout media 43 permits direct contact between the plantings and the nutrigation fluid 20 but does not provide any nutrients to the plantings.

Figure 6:
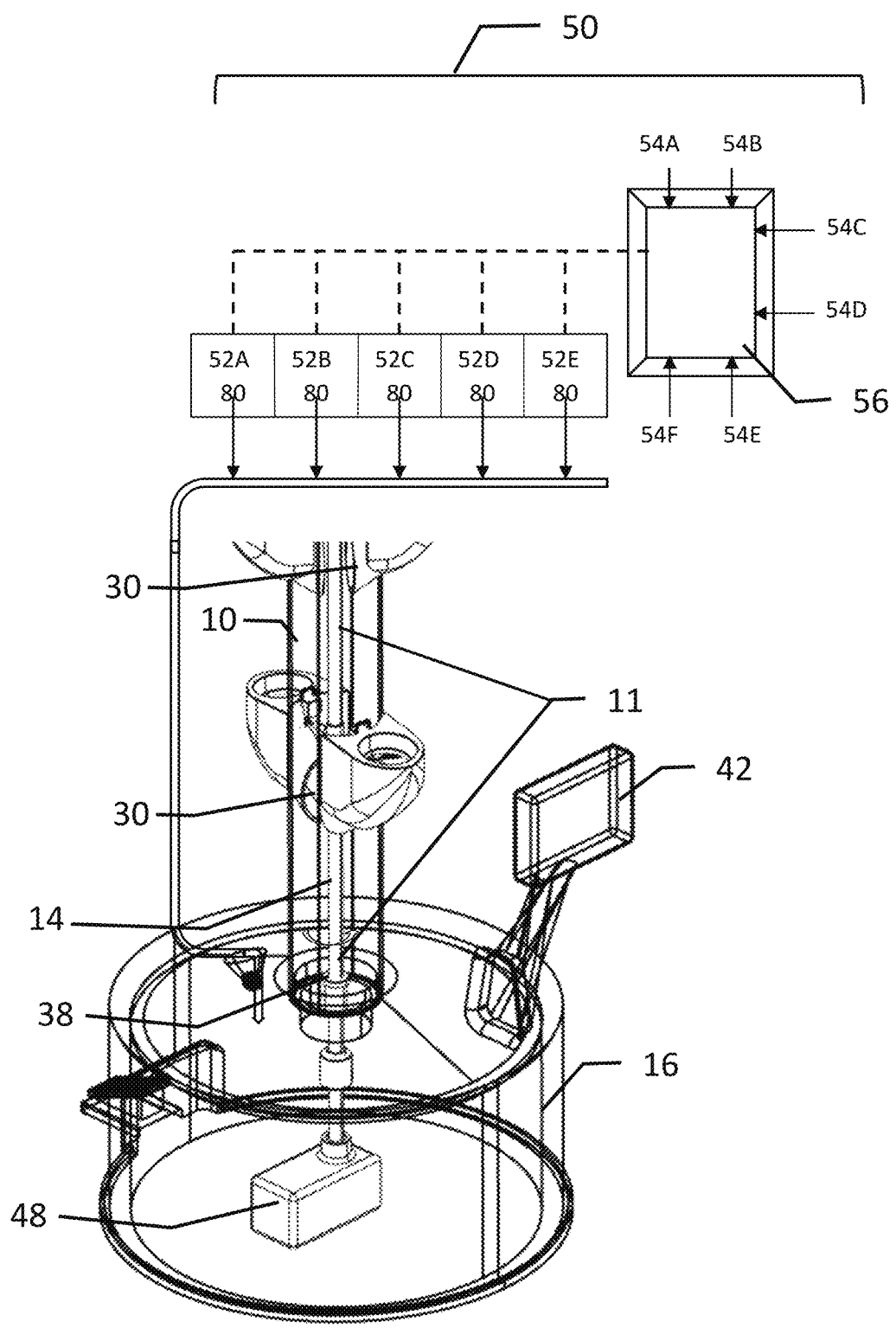
FIG. 6 illustrates the internal components of a typical reservoir.

Referring to FIG. 6, to accommodate the rotatable platform and planting column, the apparatus can include a swivel coupling 38 along central pipe 14 for allowing rotation of planting column 10 and nutrigation manifold 11 without causing rotation of the nutrigation fluid piping between the swivel coupling 38 and the reservoir 16. Swivel coupling 38 is well known to those skilled in the art and may be found at most local hardware stores. As shown in FIG. 6, a pump 48, for example a submersible pump, is provided in fluid communication with reservoir 16. A water filter 44, such as a Brita water filter or other suitable filtering system, can be installed in the nutrigation fluid 20 supply line to remove contaminants. A first supply line extends from pump 48 to a splitter connector. From splitter connector, a second supply line extends to connect with swivel connector 38 to direct water upward into the central pipe 14. A pluggable drain line is provided which extends from splitter connector to an exterior of reservoir 16 through platform 18 for selectively draining fluid from the reservoir 16 and cleaning the filter during a cleaning cycle. Various alternative arrangement involving different types of valves and supply lines may be used to accomplish the task of diverting nutrigation fluid 20 to a central pipe 14 or to a drain line and enabling a cleaning cycle.

Referring again to FIG. 6, a control valve can be included along nutrigation fluid 20 supply line and operatively associated with a growth control system 50, accordingly, for selectively controlling the amount of nutrigation fluid flow from the reservoir 16 through the central pipe 14. Control valve is necessary to adjust the flow of fluid depending on the number of modules 24 used in the planting column 10. The growth control system 50 can also vary the speed of the pump 48 to adjust the nutrigation fluid flow rate. The more modules, the higher the fluid pressure needed to pump the fluid.

For automated operation, as seen in FIG. 6, the plant growth control system 50 can be used to monitor and control plant growth. Nutrient cartridges 52A 52E can supply controlled amounts of different nutrients to the reservoir 16 as a nutrient fluid blend 56. Nutrient cartridges 52A-E can contain concentrated forms of various nutritional fluids such as typical plant fertilizers, to dispense the proper amount of the proper nutrients as determined by the plant growth control system 50. Sensors 54A 54E provide input to a control circuit 58, such as a Raspberry Pi circuit board, as inputs to the control logic and determine the proper amount of nutrients to dispense from the various nutrient cartridges 52A-52E to generate the nutrient fluid blend 56. Some of the sensors 54A-E that can be used include, nutrition concentration, water level, soil PH, soil moisture sensor, temperature sensor, humidity sensors, sunlight visible/IR/UV index sensor, and air quality sensor. Additionally, a power supply 67 is operatively associated with the pump 48 and the control system 50 for recirculating nutrigation fluid 20 and nutrient fluid blend 56 from the reservoir 16 so that watering cycles can be accomplished automatically and the duration of the cycles adjusted accordingly. The growth control system 50 can include a cleaning cycle for the water filter and the nutrigation fluid piping such that suspended solids and other contaminants can be flushed from the system through the drain line. All critical elements of the growth control system 50 can have battery back-up to maintain operation during grid power outages.

The nutrigation system may replace or supplement the liquid nutrient cartridges 52A-52E with a solid nutrient medium/supplement 80 that can provide hydroponic systems, in various sizes, the nutrition necessary to grow a variety of plant types. The solid nutrient compound can be a nutrient dense dry material either compressed or temperature molded to create an instant (within 24 hours) or time released (over days or weeks) supplement/medium that will release water soluble nutrient combinations into water and disperse on to plant medium or roots. The compound can contain natural sources of nutrients. The solid nutrient medium/supplement 80 compound reduces the complexity of adding liquid or powder nutrients into a hydroponic system, thereby eliminating the need to prepare nutrient supply in a particular way and to decrease the chance of improper use or exposure.

The solid nutrient medium/supplement can be formed with various levels of nutrients, depending on the types of plants grown together. The table below depicts the nutrient ranges sufficient to supply proper amounts of nutrients to different types of plant growth.

| Nutrient | Flowering Plants | Tomatoes | Fruit | Leafy Greens | Low-High | General |
|---|---|---|---|---|---|---|
| | | Concentration mg/l (PPM) | | | | |
| Nitrogen (N) | 170-200 | 150-200 0-20 | 50 | 150 | 50-200 | 100-250 |
| Phosphorus (P) | 40-45 | 50 | 25 | 31 | 25-50 | 30-50 |
| Potassium (K) | 280-310 | 300-500 | 150 | 210 | 150-500 | 100-300 |
| Calcium (Ca) | 115-150 | 150-300 | 65 | 90 | 65-300 | 80-140 |
| Magnesium (Mg) | 30-45 | 50 | 20 | 24 | 20-45 | 30-70 |
| Sulfur (S) | | | | 32 | NA | 50-120 |
| Iron (Fe) | | 3 | | | NA | 1-5 |
| Copper (Cu) | | .1 | | | NA | .04-.2 |
| Manganese (Mn) | | 1 | | | NA | .5-1 |
| Zinc | | .1 | | | NA | .3-.6 |
| Molybdenum | | .05 | | | NA | .04-.08 |
| Boron (B) | | .3-.5 | | | NA | .2-.5 |
| Chloride (Cl) | | Max 200 | | | NA | <75 |
| Sodium | | Max 250 | | | NA | <50 |

In another embodiment, the solid nutrient medium/supplement is disposed in the sprout media as a water soluble additive. For example, the water soluble solid nutrient medium/supplement can be integrated or infused with the sprout media similar to hydroseeding erosion control products such as mulch, blankets, netting and silt fencing. Additionally, the solid nutrient medium/supplement can be in a powder or similar form allowing growers to sprinkle a controlled amount of supplement into the sprout media as instructed by the growth control system 50. As the nutrigation fluid blend is recirculated through each grow cup, the water soluble solid nutrient compound is dissolved into the nutrigation fluid blend for absorption by the crop roots. Nutrient concentration is monitored by the growth control system 50. The supplement blend can be customized for specific crops in accordance with table above.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

The invention claimed is:

1. A hydroponic plant cultivating apparatus comprising:
   a rotatable planting column having a hollow interior for receiving a nutrigation manifold;
   at least one connect port disposed on the planting column for receiving at least one removable grow cup, the at least one connect port comprising at least one of a nutrigation coupler configured as a self-sealing valve, nutrigation nozzle, flushing port, and return opening;
   a central pipe formed within and carried by the planting column extending axially through the hollow interior for supplying nutrigation fluid from a reservoir to the nutrigation manifold;
   a platform carried by the reservoir and engaging with a bottom portion of the planting column and configured to mount the planting column in a generally vertical orientation; and
   a growth control system comprising an automated lighting system and configured to monitor and control plant growth.

2. The hydroponic plant cultivating apparatus of claim 1, wherein the at least one removable grow cup is configured to support aeroponic plant growth.

3. The hydroponic plant cultivating apparatus of claim 1, wherein the growth control system monitors and controls at least one parameter selected from the group consisting of nutrient levels, nutrigation fluid pH, nutrigation fluid flow rate, plant varietal information, moisture levels, sowing date, harvest date, temperature, humidity, lighting, air circulation rate, liquid nutrient cartridge levels, and solid nutrient compound additives.

4. The hydroponic plant cultivating apparatus of claim 3, wherein the growth control system electronically communicates with a database to record the at least one parameter.

5. The hydroponic plant cultivating apparatus of claim 1, wherein the planting column comprises a plurality of modules.

6. The hydroponic plant cultivating apparatus of claim 1, wherein the planting column rotation is controlled by foot pedal.

7. The hydroponic plant cultivating apparatus of claim 1, wherein the growth control system electronically communicates with a control circuit comprising a user interface device.

8. The hydroponic plant cultivating apparatus of claim 1, comprising an enclosure and an air circulation system configured to evenly distribute ambient air throughout the hollow interior of the planting column and the reservoir.

9. The hydroponic plant cultivating apparatus of claim 1, wherein the at least one removable grow cup further comprises sprout media.

10. The hydroponic plant cultivating apparatus of claim 9, wherein the sprout media further comprises a solid nutrient medium/supplement.

\* \* \* \* \*